Patented Dec. 3, 1940

2,223,937

UNITED STATES PATENT OFFICE 2,223,937

SULPHANILAMIDE CAMPHORATE AND PROCESS FOR MAKING IT

Joseph Ebert, Westmont, N. J., assignor to The Farastan Company, Philadelphia, Pa., a corporation of Pennsylvania No Drawing. Application December 27, 1939, Serial No. 311,128

2 Claims. (Cl. 260—501)

This invention relates to a new derivative of p-aminobenzenesulphonamide, the camphoric acid salt. This new salt has important advantages for the treatment of various infections caused by cocci, including streptococcus and particularly pneumococcus infections.

p-Aminobenzenesulphonamide, and various derivatives of this compound, have been recognized as having great value for the treatment of coccus infections, but its use has been subject to some disadvantages, such as ineffectiveness in a relatively large proportion of cases, relatively high ratio of effective dose to toxic dose, ineffectiveness against pneumococcus, etc. In accordance with the present invention, the camphoric acid salt of p-aminobenzenesulphonamide is provided. This new compound, in contrast with p-aminobenzenesulphonamide itself, is highly effective against pneumococcus, and has important advantages over the p-aminobenzenesulphonamide for the treatment of streptococcus infections, giving good results more consistently with fewer evidences of toxicity. The new compound also is quite effective for the treatment of gonococcus infections, for which p-aminobenzenesulphonamide is of little value.

The new compound is readily prepared by heating together stoichiometric quantities of p-aminobenzenesulphonamide and camphoric acid, using an appropriate solvent, advantageously an organic solvent such as alcohol. The preparation of the compound will be illustrated by the following example, although the invention is not limited thereto.

Example.—10 parts by weight of camphoric acid and 17.2 parts by weight of p-aminobenzenesulphonamide are suspended in 70 parts of pure methyl alcohol and heated to the boiling point on the water bath. The ingredients go into solution in a short time. The heating is continued for five to six hours, after which the solvent is removed by distillation and the crystalline mass remaining is dried at about 50 to 60° C. The resulting crystals may be purified by recrystallization from alcohol, and, if of a yellowish color, may be decolorized through the use of a decolorizing agent such as Darco, Norite, etc. The yield is nearly theoretical. The purified product is soluble in about 140 parts of water at 25° C. and in 40 parts by volume of absolute ethyl alcohol at 25° C. It melts at 156–158° C. (uncorrected), with partial decomposition.

I claim:
1. p-Aminobenzenesulphonamide camphorate.
2. The method of making p-aminobenzenesulphonamide camphorate which comprises reacting p-aminobenzenesulphonamide with camphoric acid.

JOSEPH EBERT.